(12) United States Patent
Esser et al.

(10) Patent No.: US 9,085,056 B2
(45) Date of Patent: Jul. 21, 2015

(54) METHOD FOR PRODUCING A PISTON RING

(75) Inventors: Peter-Klaus Esser, Kuerten (DE); Juergen Gillen, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 249 days.

(21) Appl. No.: 13/823,051

(22) PCT Filed: Sep. 2, 2011

(86) PCT No.: PCT/DE2011/001687
§ 371 (c)(1),
(2), (4) Date: Mar. 13, 2013

(87) PCT Pub. No.: WO2012/045295
PCT Pub. Date: Apr. 12, 2012

(65) Prior Publication Data
US 2013/0187340 A1    Jul. 25, 2013

(30) Foreign Application Priority Data

Oct. 8, 2010  (DE) .......................... 10 2010 047 961

(51) Int. Cl.
*B23P 15/06* (2006.01)
*F16J 9/26* (2006.01)
*F16J 9/20* (2006.01)

(52) U.S. Cl.
CPC ................ *B23P 15/06* (2013.01); *F16J 9/206* (2013.01); *F16J 9/26* (2013.01); *Y10T 29/49274* (2015.01); *Y10T 29/49281* (2015.01); *Y10T 29/49282* (2015.01); *Y10T 29/49284* (2015.01)

(58) Field of Classification Search
CPC .............. B23P 15/06; F16J 9/206; F16J 9/26; Y10T 29/49284; Y10T 29/49274; Y10T 29/49282; Y10T 29/49281
See application file for complete search history.

(56) References Cited

U.S. PATENT DOCUMENTS

| | | |
|---|---|---|
| 3,337,938 A | 8/1967 | Prasee |
| 2007/0128807 A1 | 6/2007 | Fischer et al. |
| 2010/0019458 A1 | 1/2010 | Esser et al. |
| 2010/0044969 A1 | 2/2010 | Fischer et al. |
| 2012/0205876 A1 | 8/2012 | Fujimura et al. |
| 2013/0181411 A1* | 7/2013 | Esser ............................ 277/443 |
| 2014/0008874 A1* | 1/2014 | Esser ............................ 277/443 |

FOREIGN PATENT DOCUMENTS

| | | |
|---|---|---|
| DE | 1775854 | 9/1971 |
| DE | 1 675 376 | 11/1971 |
| DE | 103 59 802 | 3/2005 |
| DE | 10 2006 046 915 | 3/2008 |
| DE | 10 2007 007 961 | 8/2008 |
| FR | 1484353 | 6/1967 |
| GB | 1441961 | 7/1976 |
| WO | WO-2011/064888 | 6/2011 |

* cited by examiner

*Primary Examiner* — Ryan J Walters
(74) *Attorney, Agent, or Firm* — Jordan and Hamburg LLP

(57) ABSTRACT

A piston ring is produced by providing a metallic main body, at least including a radially outer running surface, a radially inner circumferential surface and upper and lower flank surfaces interposed therebetween, with a defined taper in the region of an approximately cylindrical running surface, providing at least the running surface with at least one wear-resistant layer, and removing the at least one wear layer in the region of the entire circumference of the ring that forms a scraping edge forming a land having a predefinable width.

7 Claims, 3 Drawing Sheets

METHOD FOR PRODUCING A PISTON RING

BACKGROUND OF THE INVENTION

The invention relates to a method for producing a piston ring.

In many cases, piston rings are produced from cast iron, cast steel or steel wire. At present, the use of piston rings includes those containing so-called self-sharpening scraping edges in the form of annular recesses including chrome layers.

DE 10 2007 007 961 A1 discloses a piston ring, comprising a main body, which has a substantially circumferential running surface, an upper and a lower flank surface, and an inner circumferential surface, wherein the region of transition of the running surface at least into the lower flank surface is provided with an edge≤0.1 mm, and the running surface is provided with at least one PVD topcoat≤10 mm.

DE 103 59 802 B3 describes a piston ring and a method for producing the same. The piston ring has a running surface, which is provided with a running surface profile, and an upper and a lower flank surface, wherein at least the running surface is provided with a vapor deposition layer so that a sub-region of the running surface is provided with a removable coating, whereby a substantially sharp-edged contact edge is present between the running surface and at least one of the flank surfaces after generation of the vapor deposition layer and removal of the coating.

SUMMARY OF THE INVENTION

It is the object of the invention to provide an alternative method for generating piston rings that are provided with a PVD (physical vapor deposition) layer, in which the piston ring has improved scraping action as compared to the prior art.

This object is achieved by providing the running surface with a PVD topcoat, wherein when a PVD topcoat is present, the same is removed down to the base material of the running surface so as to form the land.

Advantageous refinements of the method according to the invention are disclosed in the related dependent method claims.

Moreover, the present invention also provides a compression piston ring having a self-sharpening scraping edge produced in accordance with the above described method according to the invention.

The method according to the invention, which is to say generating a defined taper in a region of the running surface configures with the at least one wear-resistant layer, can bring about improvement in the scraping action of the piston ring, and more particularly of the compression piston ring, by the forming of a self-sharpening scraping edge (functional edge) which is not subject to risks of chipping.

Depending on the range of application of the piston ring, it may be useful to provide the running surface with what is known as a multi-layer system. Such systems are described in DE 10 2006 046 915 B3, for example.

The taper of the ring running surface is advantageously introduced mechanically, i.e., by cylindrical machining, for example grinding into the running surface.

According to a further aspect of the invention, the land width that is exposed after the cylindrical machining step preferably is from 0.05 to 0.45 mm.

The running surface taper, for example from 30 to 120 minutes, is introduced prior to the coating step, the procedure not being dependent of the ring material.

In the case of cast iron piston rings, the scraping edge can be sharp-edged (90°) or rounded, having a radius of up to 0.1 mm, as needed.

In the case of steel rings, the region of the scraping edge can be nitrided or unnitrided. In the non-nitrided embodiment, the scraping edge can be sharp-edged (90°).

In the nitrided steel ring embodiment, the following ring designs may be provided as needed:

the scraping edge has a radial indent<0.1 mm, the steel land and the running surface are nitrided, wherein no nitride layer is present beneath the PVD top coat;

the scraping edge is provided with a bevel<0.15 mm, the steel land and the running surface are nitrided, wherein in this case a nitride layer remains beneath the PVD topcoat.

Depending on the material and application, piston rings, and more particularly compression piston rings, can thus be produced, which are provided with at least one wear-resistant layer, preferably a PVD layer.

If the PVD layer is to be regarded as the topcoat, the same is removed approximately cylindrically down to the base material in the region of the scraping edge, whereby a land having a predefinable width is produced.

If several wear layers are present, the PVD topcoat can either be ground down to the base material of the running surface, or only ground down as much as is needed for at least one wear-resistant layer (for example a nitride layer) to remain beneath the PVD top coat.

Both embodiments have in common that, in any case, a land having a defined width is formed in the region of the scraping edge that is sharp-edged, rounded or provided with a bevel.

The subject matter of the invention is shown in the drawings based on an exemplary embodiment and is described as follows and shown in the drawings.

BRIEF DESCRIPTION OF THE DRAWINGS

FIGS. 1A, 1B, 1C are cross-sectional profiles constituting a graphical representation of the production of a piston ring according to;

FIG. 1A shows an enlarged view of a piston ring main body 1, which, initially had a rectangular shape. This cross-sectional profile shows the following piston ring regions: a lower flank surface 2, an upper flank surface 3, an inner circumferential surface 4, and a running surface 5. So as to generate a sharp-edged scraping edge 6 (functional edge), a running surface taper 5' (for example 100 minutes) is mechanically introduced into the running surface 5 over a predefinable height h thereof. The main body 1 is apparent in FIG. 1B, but this time the same is provided with a PVD topcoat 7, which is deposited on the running surface 5 over the predefined running surface profile 5'.

FIG. 1C shows that the PVD topcoat 7 is ground down to the base material of the running surface 5 so as to generate a land 8 having a predefined width h'. This type of machining creates the sharp-edged scraping edge 6, which, as a result of the defined distance h' from the PVD topcoat 7, is not subject to risks of chipping and is self-sharpening during operation.

FIGS. 1B, 1C show that the PVD layer 7, being the only wear-resistant layer, also forms the topcoat.

FIG. 2A represents the finished piston ring 1' according to FIG. 1C. The width of the land 8 is indicated as being 0.05 to 0.45 mm in this example.

Depending on the material selected for the piston ring 1', it may be useful to provide curvature or chamfers (bevels) in the region of the scraping edge 6 of the piston ring 1'. FIG. 2B shows a piston ring 1' having a maximum radius of 0.1 mm in the region of the scraping edge 6.

Figure 1A:
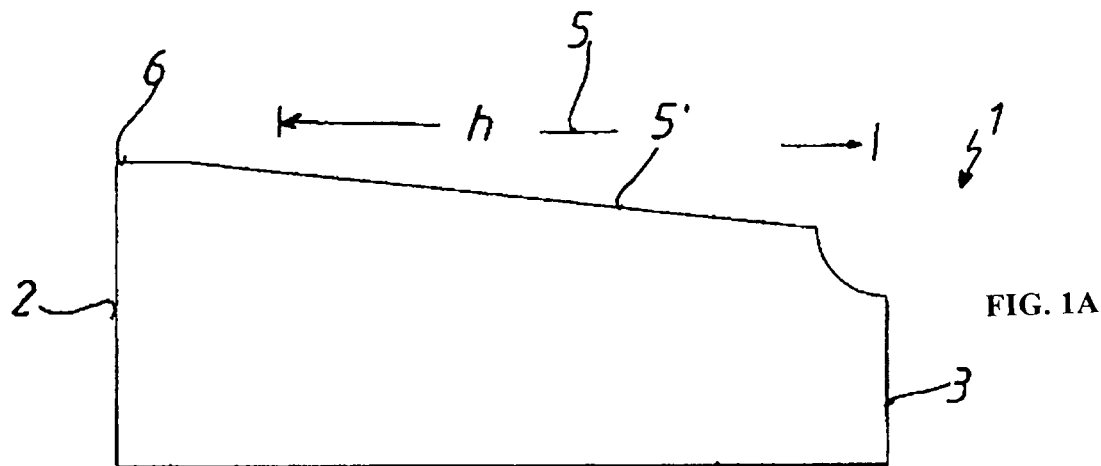
Figure 1B:
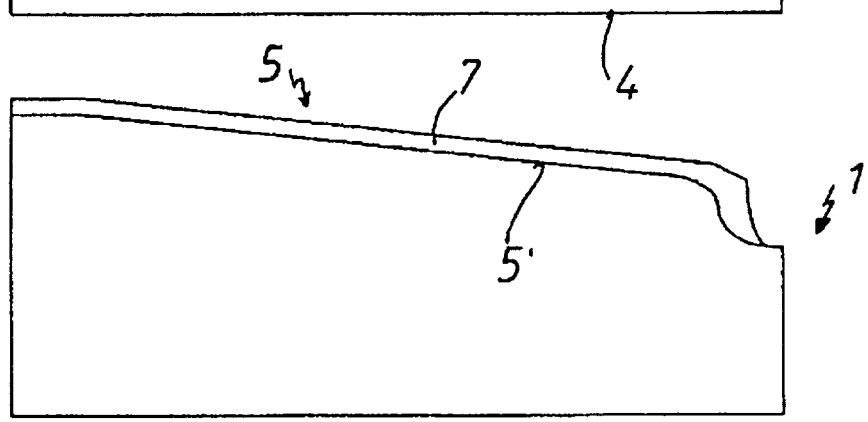
Figure 1C:
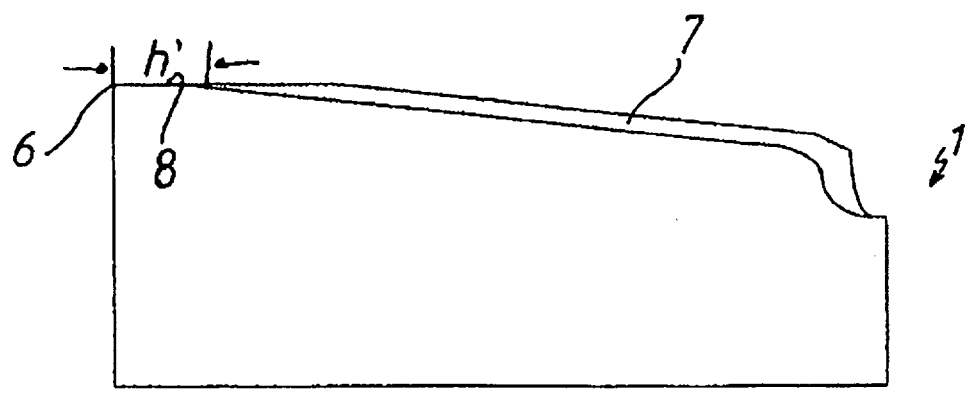
Figure 2A:
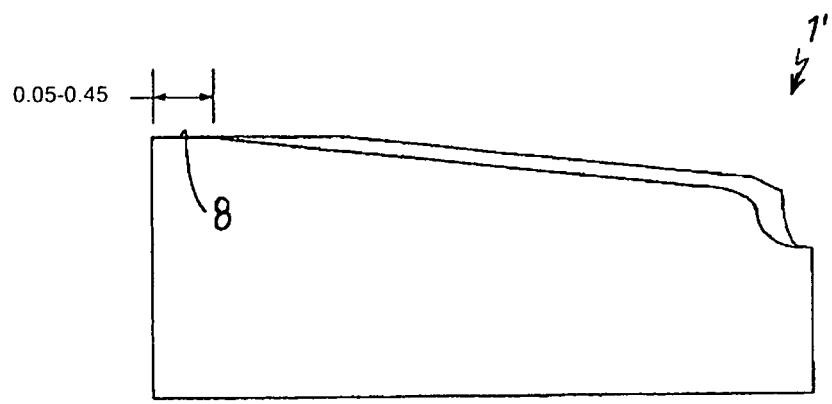
FIGS. 2A, 2B, 2C are cross-sectional profiles of various embodiments of a piston ring produced in accordance with the method according to the invention.
Figure 2B:
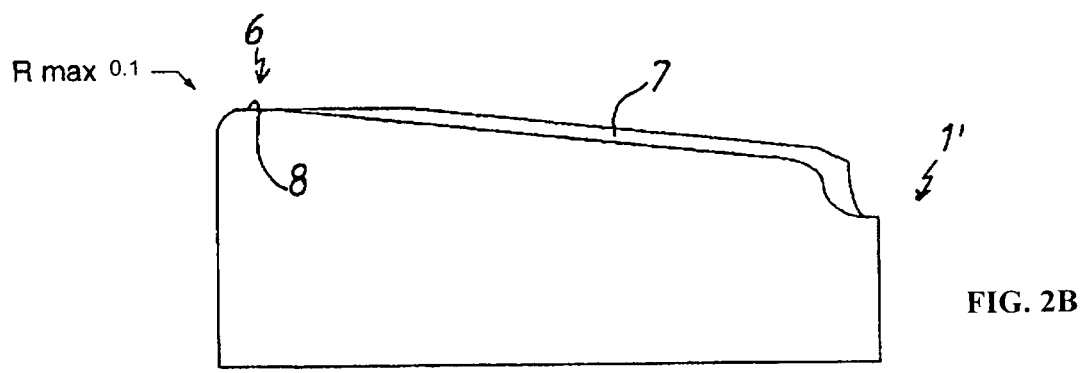
Figure 2C:
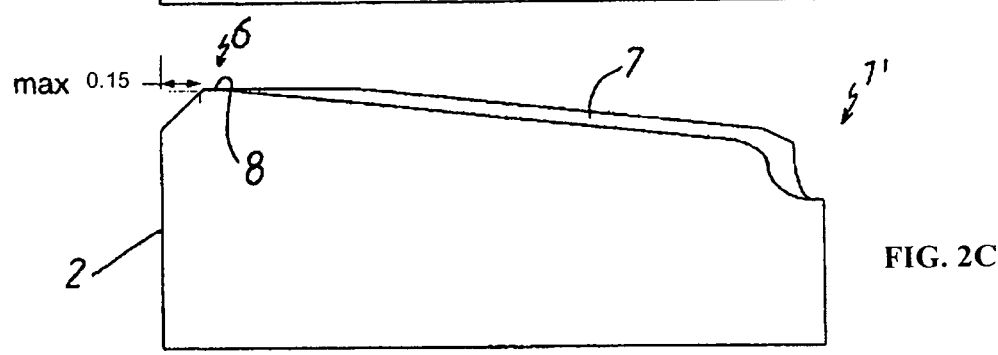

A chamfer/bevel is apparent in FIG. 2C, the chamfer/bevel extending into the lower flank surface 2 at an angle. The land width here is reduced by a maximum of 0.15 mm.

In the case of steel piston rings, the scraping edge 6 can be nitrided or unnitrided, and in the non-nitrided embodiment the scraping edge 6 is advantageously designed to be sharp-edged (90°), as is shown in FIG. 2A.

Figure 3A:
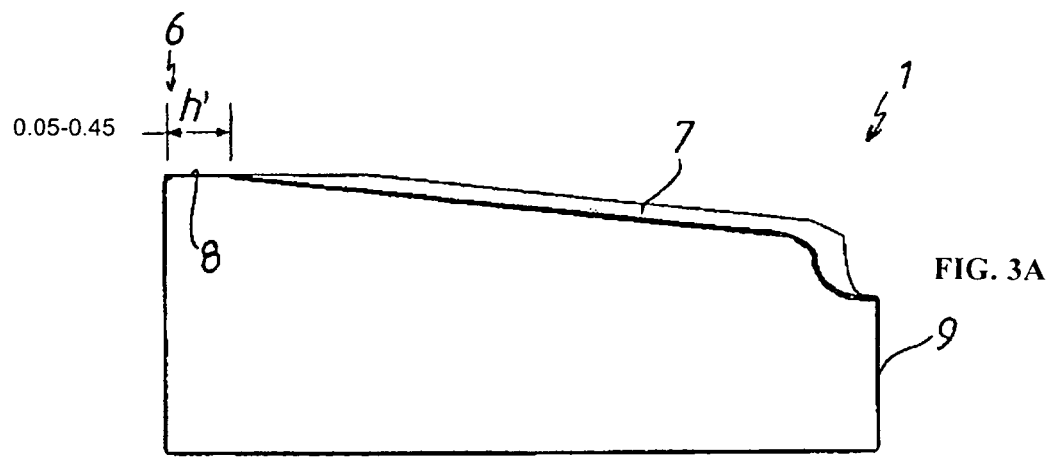
FIGS. 3A, 3B, 3C are cross-sectional profiles of at least partially nitrided piston rings of the invention that are provided with a PVD topcoat.
Figure 3B:
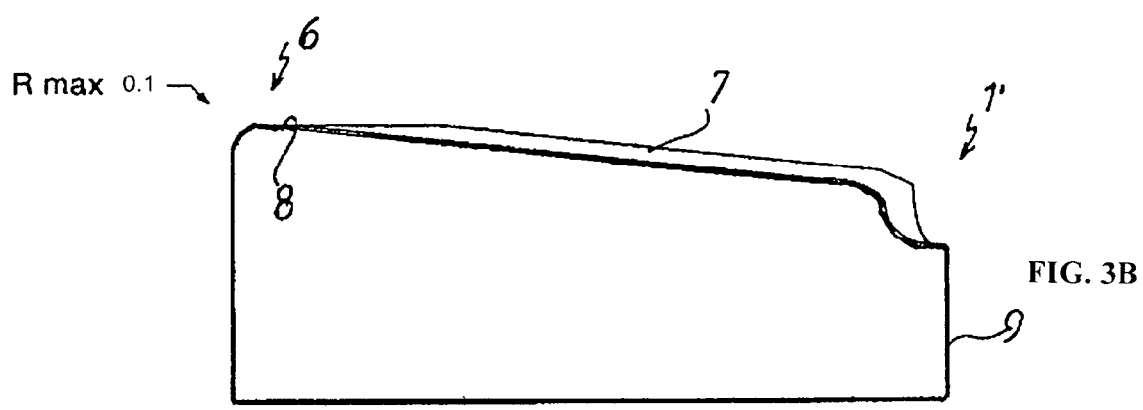
Figure 3C:
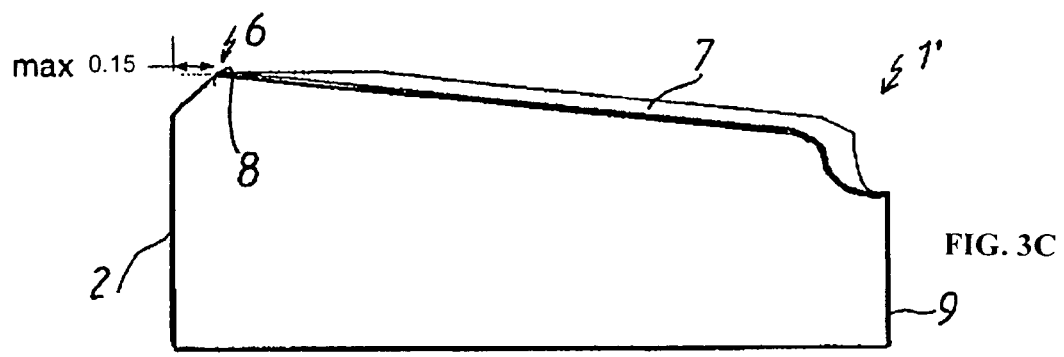

FIGS. 3A, 3B, 3C correspond to FIGS. 2A, 2B, 2C, respectively in terms of the contours. The difference compared to FIGS. 2A, 2B, 2C is that the land 8 and the running surface 5 are nitrided before the PVD topcoat 7 is applied. In this case, the grinding step for the PVD layer 7 is to be carried out so that the nitride layer 9 remains on the land.

In the case of nitrided steel ring embodiments, the modifications of the scraping edge 6 shown in FIGS. 3B, 3C can be provided. To this end, the flank surfaces 2 and 3, the running surface 5 and the circumferential running surface are nitrided before the PVD topcoat 7 is applied. After the PVD topcoat 7 has been removed in the region of the land 8, no nitride layer remains beneath the PVD topcoat 7 (FIG. 3A). However, it is also conceivable to remove the PVD topcoat 7 in the region of the land 8 so that a desired nitriding of the land 8 is preserved (FIGS. 3A, 3B, 3C).

The invention claimed is:

1. A method for producing a piston ring, comprising
providing a metallic body having an axis of symmetry including a radially outer circumferential running surface, a radially inner circumferential surface and upper and lower flank surfaces interposed therebetween, with a taper in the region of the running surface,
providing at least the running surface with at least one wear-resistant layer comprising a PVD topcoat, and
at least partially removing a region of the at least one wear-resistant layer to form a circumferential scraping edge with an abutting circumferential land of predetermined width which is parallel to the axis of the metallic main body, at least the PVD topcoat having been removed from both the scraping edge and the land, and the land comprising base material of the running surface.

2. The method according to claim 1, wherein at least sub-regions of the running surface are nitrided and the running surface is subsequently provided with a PVD topcoat.

3. The method according to claim 1, wherein the scraping edge is non-nitrided or nitrided.

4. The method according to claim 1, wherein the scraping edge is formed with a sharp edge.

5. The method according to claim 1, wherein the scraping edge is rounded and extends into the flank contiguous therewith at a radius of no more than 0.2 mm.

6. The method according to claim 1, wherein the scraping edge is provided with a chamfer that extends into the flank contiguous therewith at an angle of greater than 30°.

7. A method according to claim 1, wherein the main body is made of cast iron, cast steel or steel wire.

* * * * *